May 7, 1935. H. E. LIPPERT 2,000,468
LOCOMOTIVE FUEL CONVEYER
Filed March 26, 1934   2 Sheets-Sheet 1
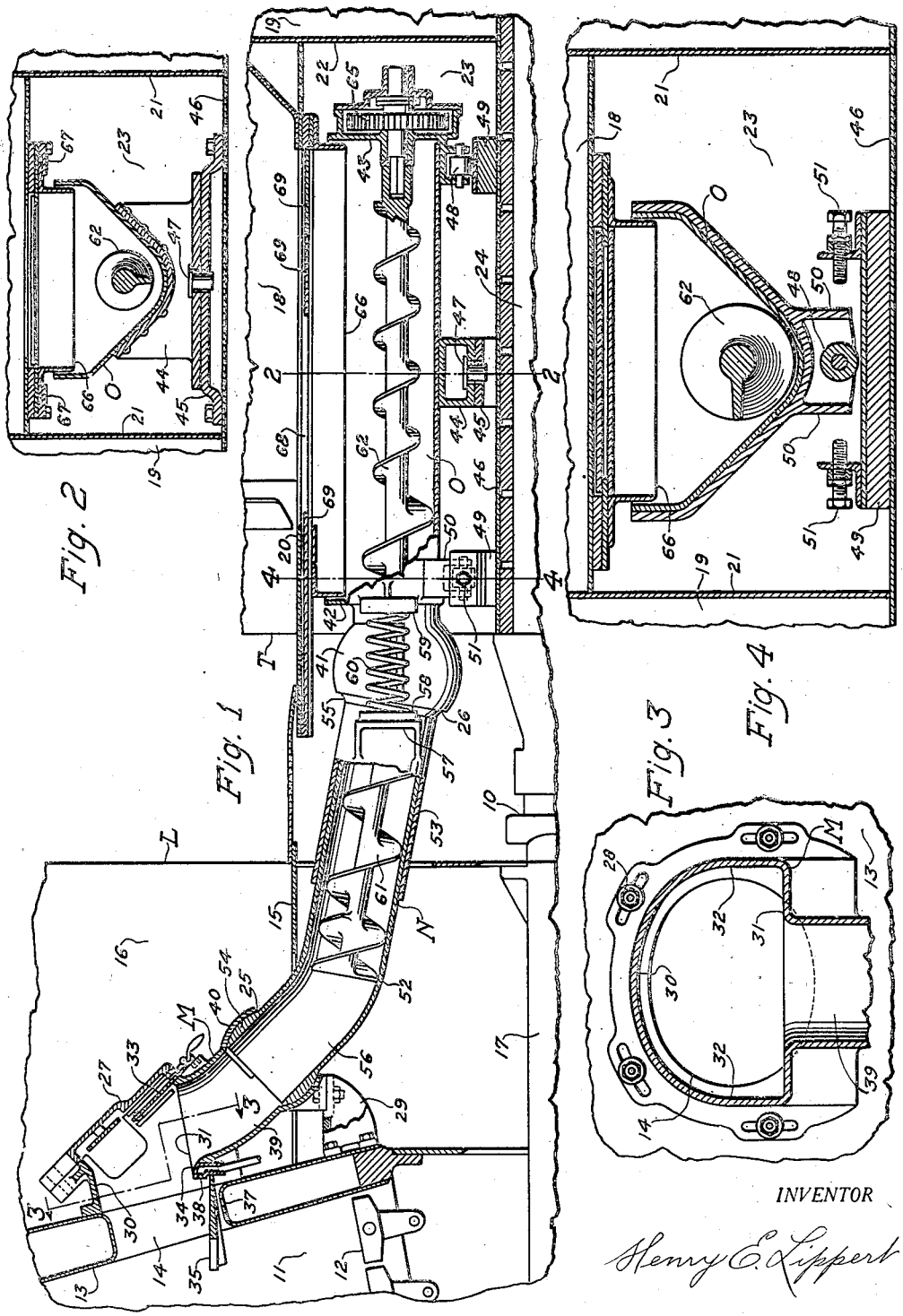
INVENTOR
Henry E. Lippert

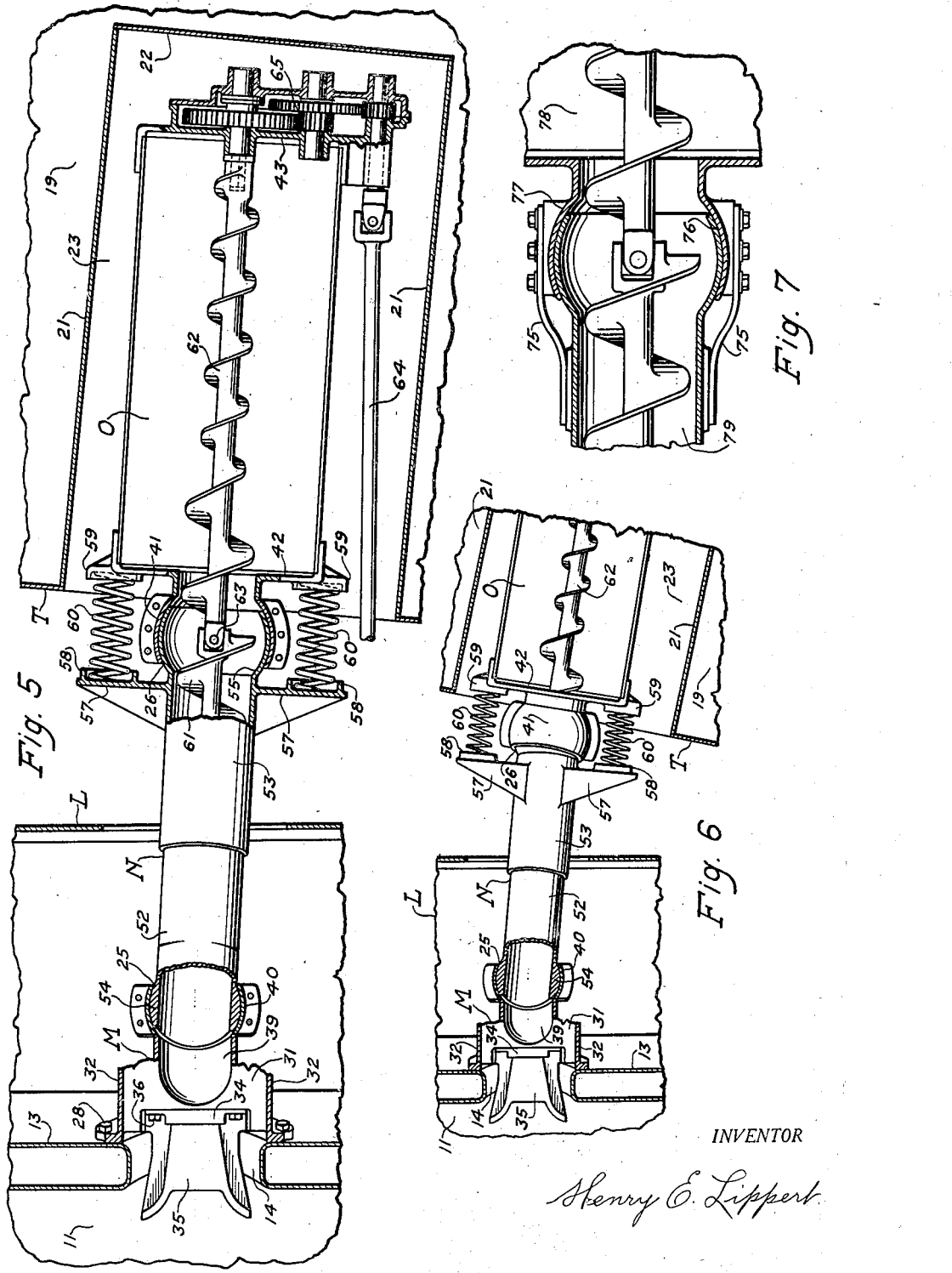

Patented May 7, 1935

2,000,468

UNITED STATES PATENT OFFICE 2,000,468

LOCOMOTIVE FUEL CONVEYER

Henry E. Lippert, Pittsburgh, Pa.

Application March 26, 1934, Serial No. 717,295

20 Claims. (Cl. 198—15)

This invention relates to fuel conveyers for intercoupled locomotives and tenders, and particularly to the conduit system thereof.

A commonly known fuel conveyer or stoker for locomotives consists of a conduit section rigidly secured to the locomotive for delivering fuel to the firebox, a conduit section or trough rigidly secured to the tender for receiving fuel from the bunker, and an intermediate conduit section having a ball joint connection with each of the other sections. Assuming that the tender and locomotive are on straight tracks, the axes or centers of these conduit sections lie in the vertical central plane of the tender and locomotive. A helical screw in the conduit section on the tender is universally jointed to a helical screw in the intermediate section at the ball joint between these conduit sections. When the locomotive and tender pass over curved tracks the position of the conduit section on the tender and the conduit section on the locomotive, of course, remain fixed with respect to the vehicle upon which they are mounted, and the intermediate section swings laterally with respect to both the locomotive and tender for accommodating the lateral displacement between the rear end of the locomotive and forward end of the tender. This movement of the intermediate section causes the vertical plane through the axis thereof to be disposed angularly with the vertical central planes through the other sections and a corresponding disposition of the helical screws in the conduit sections, thus producing an angle on the universal joint between these screws. The angle on this universal joint when the locomotive and tender negotiate curves in some instances is quite severe, depending on the structure of these vehicles or on the length of the intermediate conduit section. When the locomotive and tender are of a design requiring a comparatively short intermediate section, the angle imposed on the universal joint between the screws is most severe.

It is one of the objects of this invention to arrange and mount a fuel conveyer, comprising a plurality of conduit sections flexibly connected together and a helical screw in each section universally jointed together, upon an intercoupled tender and locomotive in a manner that the angle produced on the universal joint between the screws when the vehicles pass over sharp curves is reduced, as compared to the angle imposed on the corresponding universal joint in the above described structure. Another object is to provide such a conduit structure that the maximum angle produced on the joint between the helical screws can be reduced to any desired extent, thus increasing the efficiency of the universal joint and the period of time it is useful for service, and permitting the conveyer to be installed on practically all classes of domestic steam actuated locomotives, irrespective of the necessity of providing a short intermediate conduit section.

Another well known form of locomotive fuel conveyer consists of a conduit section rigidly attached to the locomotive to deliver fuel to the firebox, and a conduit section or trough mounted on the tender and having a ball joint connection with the section on the locomotive. This latter conduit section is positioned in a compartment on the tender to receive fuel from the bunker and arranged to swing laterally with respect to the central longitudinal vertical planes of the locomotive and tender when the vehicles negotiate curved tracks. The conduit section on the tender swings a considerable distance when the vehicles pass over "cross-overs" or sharp curves, particularly so when this conduit section is unusually long, and the compartment in the tender which houses this section must be of a width to facilitate such movement without permitting the conduit section to strike the side walls of the compartment. This compartment occupies a portion of the tender which otherwise would be used as space for storing water. It is highly desirable that the tender carry as much water as possible, and for this reason the width of the compartment should be no greater than that sufficient to accommodate the swing of the conduit section.

A further object of the invention is to provide a fuel conveyer conduit system, including a conduit section mounted to swing laterally in a compartment on the tender, upon an intercoupled locomotive and tender whereby the lateral swinging movement of the conduit section on the tender can be limited, permitting the provision of a compartment of comparatively narrow width. Another object is to provide means for limiting the lateral swing of such a conduit section so that the section may be installed on any tender having a compartment wide enough to receive it. Should the compartment be of a width in which the conduit section fits close to the side walls thereof, the swing of the section can be limited to only a slight degree and if the compartment is considerably wider than the conduit section the means for limiting the swinging movement can be adjusted so the conduit section is allowed to swing a greater degree but not collide with the side walls of the compartment. This arrangement permits use of a relatively long conduit section mounted to swing laterally in the tender, without sacrificing an undesirably large volume of water space.

Still another object of the invention is to provide a conduit system for intercoupled locomotives and tenders comprising a plurality of conduit sections flexibly jointed together, each of which sections is arranged to swing laterally with respect to the vertical central planes of the tender and locomotive to facilitate lateral displacement between the adjacent ends of the vehicles on curves. Another object is to provide such a conduit system so that both conduit sections swing laterally together when the locomotive and tender travel over tracks of a degree of curvature within a predetermined range, and one conduit section swings alone when the adjacent ends of the vehicles are further displaced laterally with respect to one another in passing over tracks of a degree of curvature greater than the predetermined range.

Frequently it is desirable to locate conveyer driving mechanism, such as an engine or drive shaft, at one side of a conduit section mounted to swing laterally in the tender, and it is a further object of this invention to provide means for limiting the swing of the conduit section so that it will not strike the driving mechanism.

On the accompanying drawings, forming a part hereof:

Fig. 1 is a vertical longitudinal central section of the rear portion of a locomotive, and the forward portion of a tender, and the invention, showing parts of the invention in elevation.

Fig. 2 is a transverse sectional view taken on line 2—2 of Fig. 1.

Fig. 3 is an enlarged transverse section taken on line 3—3 of Fig. 1.

Fig. 4 is a transverse sectional view on an enlarged scale taken on line 4—4 of Fig. 1.

Fig. 5 is a sectional view of the rear portion of the locomotive taken on a horizontal plane through the firing opening and of the forward portion of the tender taken on a horizontal plane through the compartment for receiving the conveyer, showing the invention with parts broken away mounted thereon. This view illustrates the position of the locomotive, the tender and the conveyer with relation to one another when the locomotive and tender negotiate a track of a degree of curvature within a predetermined range.

Fig. 6 is a view on a reduced scale similar to Fig. 5, and shows the position of the locomotive, the tender and the conveyer with relation to one another when the vehicles pass over a track of a degree of curvature greater than a predetermined range.

Fig. 7 is a horizontal section illustrating a modification of a feature of the invention.

Like numerals and reference characters in the various figures of drawings indicate corresponding elements and features of construction herein referred to. Referring to Figs. 1 to 6, inclusive, a locomotive designated generally by the letter L is coupled at 10 in the conventional manner to a tender T. The locomotive firebox 11 has grates 12 and a backhead 13, the backhead being provided with a firing opening 14 above the elevation of a cab deck 15 of the locomotive cab 16. The firebox and cab are carried by the frame 17 of the locomotive.

The tender has a fuel bin or bunker 18, a water compartment 19, and a deck 20 which extends beneath the fuel bunker. A portion of the water compartment 19 is separated from the remainder thereof by vertical plates 21 and a vertical plate 22 to form a compartment 23 between the bunker 18 and the tender frame 24 for receiving the rear end of a fuel conveyer. Plates 21 are disposed longitudinally of the tender and form the side walls of compartment 23 and plate 22 is disposed transversely of the tender and forms the rear end wall of this compartment.

The conveyer comprises, generally speaking, a member M attached to the backhead 13, a conduit section or trough O mounted on the tender in compartment 23, and an intermediate conduit section N having a ball joint connection 25 with the member M and a ball joint connection 26 with the trough O.

The member M serves as a support or frame for a firedoor 27 and as a part of the conduit system. It is rigidly secured at its upper end to the backhead by studs 28, and at its lower end by means of a bracket 29. The upper portion of member M surrounds the firing opening 14 and is composed of a top wall 30, a bottom wall 31 and side walls 32. These walls are disposed at right angles to the backhead and form, in effect, continuations of the walls of the firing opening 14, and cooperate with the walls of the firing opening to provide a tunnel affording communication between the firebox chamber and the cab 16 when the firedoor 27 is opened. Firedoor 27 closes the opening defined by the rear edges of walls 30, 31 and 32, and it may be operated in the same manner as the well known "Butterfly" type of firedoor.

A manually operable supplementary door 33, arranged to be moved in an upwardly and forwardly inclined plane immediately forward of the main firedoor 27, closes the lower half only of the opening defined by rear edges of these walls to prevent contact of the fuel with the firedoor 27 and also prevent fuel from spilling out of the member M onto the cab deck 15 when the firedoor 27 is opened to inspect the fire. If it is desired to fire the locomotive by hand the supplementary door 33 may be moved to its lower position to provide an opening of sufficient size to permit hand firing.

Fuel distributing apparatus, consisting of a head 34 and a plate 35, is secured to the member M by bolts 36, and the plate 35 extends through the firing opening 14 adjacent the bottom wall 37 thereof. Blasts of pressure fluid issue from the head 34 through jet holes 38 for discharging fuel over the top surface of plate 35 onto the firebed on the grates.

The lower portion of member M forms a tubular conduit section 39 extending downwardly and rearwardly from the distributing apparatus to the cab deck 15. This conduit section opens upwardly into the bottom wall 31 (Fig. 3), and the rear half of the upwardly open end of conduit section 39 is directly beneath the manually movable door 33. Section 39 forms the upper part of an elevating conduit through which fuel is forced by transfer means in the conveyer conduit system, and terminates at its lower end in a spherical flange 40 which constitutes one element of the ball and socket joint 25.

Conduit section or trough O opens upwardly to receive fuel from the bunker 18. A spherical flange 41 is provided on the front surface of the trough end wall 42 and forms a part of the ball and socket joint 26. One side of a gear case 43 serves as a closure for the rear end of the trough. A support member 44 on the underside of trough O and approximately equidistant from the ends of the latter is mounted on a brace 45 secured to the floor 46 of compartment 23. An aperture in the support member 44 is vertically alined with an aperture in the brace 45, and a pin 47 inserted in these apertures serves to hinge trough O to the tender so that the trough is capable of swinging laterally about a vertical axis. This pivotal attachment prevents bodily shifting of the trough both longitudinally and transversely of the tender. It is preferable that the portion of trough O forward of a transverse plane through the support member 44 balance the portion rearward thereof. However, to prevent tilting or movement of the trough vertically, rollers 48 are provided at the ends of trough O on the underside thereof to engage tracks 49 on the floor 46.

A lug 50 depends from the bottom of the trough on each side thereof. These lugs are each arranged to contact a stop for limiting the lateral swinging movement of the trough in opposite directions. The stops are herein shown as adjustable screws 51, one of which is mounted on each end of front track 49. The screws 51 may be adjusted so that the trough can swing from the center of the tender either the same or a greater distance in one direction than in the opposite direction.

The tubular intermediate conduit N comprises a forward section 52 and a rearward section 53 in telescopic relation with one another. A ball element 54 formed on the front end of forward section 52 and a ball element 55 provided on the back end of rearward section 53 are received by spherical flanges 40 and 41, respectively, whereby the intermediate conduit N is supported at one end on the locomotive and at its other end on the tender. Conduit sections M and N are attached together and connected in end to end relation by ball joint 25, and conduit section N and trough O are attached together and connected in end to end relation by ball joint 26. Vertical movement of the tender with respect to the locomotive, which occurs when the vehicles pass over "turn-tables" and "crossovers", is facilitated by this flexible mounting of the intermediate conduit section. Forward section 52 of the conduit N is bent, and the portion 56 forward of the bend turns upwardly and forms the lower part of the elevating conduit through which the fuel is forced.

An arm 57 extends outwardly on each side of rearward section 53 of the conduit N adjacent ball joint 26. Each of these arms is provided on its rear surface with an annular rim 58, and a seat 59 is formed on trough front end wall 42 in longitudinal and horizontal alinement with each of these rims. A coil spring 60 at each side of ball joint 26 is received at its rearward end in one of the seats 59, and is held in place at its front end against the arm 57 that is directly forward of the seat in which it is received, by the rim 58 on that arm. Springs 60 are thus interposed between conduit sections N and O. When in this position springs 60 are under compression and act to maintain the axes of conduit sections N and O in a common vertical plane when lateral movement of the conduit section or trough O is not prevented, or stated in other words, they prevent the intermediate conduit section N from becoming disposed angularly with respect to the trough O in a horizontal plane when the trough is not in contact with one of adjustable screws 51.

Fuel transfer means in the conveyer consists of a helical screw 61 within the conduit section N and a helical screw 62 in the trough O. These helical screws are connected by a universal joint 63 at the center of ball joint 26. Screw 61 terminates at its forward end at the bend in the intermediate conduit section. Helical screw 62 is operatively connected to a drive shaft 64 by means of power transmitting mechanism 65 in gear case 43. Drive shaft 64 extends along one side of trough O and is attached at its forward end to a driving engine (not shown) which may be mounted either on the tender or locomotive.

To prevent loss of fuel between the tender deck 20 and the trough, a sealing frame 66, rectangular in shape and formed of angle irons, is attached to the underside of the tender deck by clamps 67 and arranged to extend downwardly into the trough to swing laterally therewith.

In operation, fuel falls from the bunker 18 through an opening 68 in the tender deck 20 into the trough O. The position of opening 68 may be varied by slide plates 69 as the bunker becomes depleted. The fuel is conveyed through the trough by helical screw 62 and through the portion of intermediate conduit section N rearward of the bend therein by helical screw 61, and it is forced from the front end of screw 61 through the upturned portion 56 of the intermediate conduit section and through the conduit section 39 into the upper part of the member M. The column of fuel advanced upwardly from conduit section 39 is directed by the supplementary door 33 forwardly onto the distributing plate 35, from which it is discharged onto the firebed on the grates by blasts of pressure fluid which issue from jet holes 38 in the distributing head 34.

When the locomotive and tender travel over tracks of a degree of curvature within a predetermined range, the conduit sections N and O swing laterally together to facilitate lateral displacement of the rear end of the locomotive with respect to the forward end of the tender, the axes of these sections remaining in a common vertical plane (Fig. 5). The distance these conduit sections can swing laterally with their axes in a common vertical plane is determined by adjustable screws 51. Should the tracks over which the vehicles pass be of a degree of curvature greater than the predetermined range, the conduit section O will swing laterally with the conduit section N until the section O comes in contact with one of the adjustable screws 51, then the conduit section N will swing laterally alone to permit further lateral displacement between the adjacent ends of the locomotive and tender. The vertical central plane of the section N will then become angularly disposed with the vertical plane of conduit section O (Fig. 6). This angular movement of conduit section N with relation to section O will compress one of coil springs 60 and permit the other spring to expand.

By way of example, assume that the most severe curve over which the vehicles travel is a curve of twenty degrees, and it is desirable that conduit sections N and O swing together when the vehicles pass over tracks of a degree of curvature between zero and ten degrees. The distance the conduit section O will swing when the locomotive and tender negotiate a ten degree curve is determined by a layout and the adjustable screws 51 set to allow conduit section O to swing the computed distance. Should the vehicles travel over tracks of a degree of curvature greater than ten degrees, the axes of conduit sections N and O will remain in a common vertical plane until the curvature of the tracks becomes ten degrees, when conduit section O will contact one of adjustable screws 51. Swinging movement of the section O is then prevented, and when the curvature of the tracks exceeds ten degrees further lateral displacement between the adjacent ends of the vehicles is facilitated solely by the intermediate conduit section N. When the vehicles move back onto a straight track the reverse action occurs.

By providing a structure which permits conduit section O to swing a limited distance with conduit section N, the angle produced on universal joint 63 when the vehicles travel on tracks of maximum curvature is reduced, as compared to the maximum angle that would be imposed on this joint if the conduit section O was rigidly secured to the tender. The maximum angle produced on universal joint 63 can be reduced any desired extent by adjusting screws 51 to increase the range of movement of conduit section O.

A trough receiving compartment 23 of comparatively narrow width can be provided with the novel conduit structure set forth herein, and a relatively long trough can be installed and arranged to swing laterally in the tender without occupying undue water space, since the lateral swinging movement of the trough can be limited by adjustable screws 51. The screw 51 on the same side of trough O as drive shaft 64 can be adjusted to limit the lateral swing of the trough for preventing it from striking the drive shaft.

It is not the purpose of this invention to eliminate altogether the angle produced on universal joint 63 nor to prevent lateral swinging of the trough O, as the attainment of the one would result in the defeat of the other. In this invention the maximum angle produced on universal joint 63 and the range of movement of the trough O are both reduced, in comparison to the maximum angle produced on the universal joint between the helical screws and the range of movement of the swinging tender conduit section of the commonly known devices described at the beginning of this specification.

Fig. 7 illustrates a modified form of the means for maintaining the axes of the intermediate conduit section and the trough in a common vertical plane when the trough is not in contact with either of adjustable screws 51. A plate spring 75 is provided at each side of a ball joint 76. The rear ends of plate springs 75 are secured to a spherical flange 77 on the forward end of a trough 78, and the front ends of these springs are arranged to press against opposite sides of an intermediate conduit section 79. The front ends of springs 75 slide a slight distance on the sides of the conduit section 79 when the latter swings angularly with respect to trough 78.

It is to be understood that the invention is not limited to the particular constructions shown and described, and that changes in design of the separate parts and various arrangements of the different elements may be made without departing from the spirit and scope of the invention.

I claim:

1. In an intercoupled locomotive and tender, a conveyer comprising a conduit section mounted on one of said vehicles and arranged to swing laterally with respect thereto when the vehicles operate around a curve, a conduit section flexibly jointed at one end to the first-named section and supported at its other end on the other vehicle, the second-named section extending from the locomotive to the tender and arranged to swing laterally with respect to both vehicles when the vehicles operate around a curve, one of said conduit sections being arranged to facilitate maximum lateral displacement between the adjacent ends of the vehicles, the other conduit section being arranged to facilitate only a portion of said displacement, and transfer means in the conduit system.

2. In an intercoupled locomotive and tender, a conveyer comprising a conduit section mounted on one of said vehicles and arranged to swing laterally with respect thereto when the vehicles operate around a curve, means for preventing movement of said conduit section in a vertical plane, a conduit section flexibly jointed at one end to the first-named section and supported at its other end on the other vehicle, the second-named section extending from the locomotive to the tender and arranged to swing laterally and vertically with respect to both vehicles when the vehicles operate around a curve, one of said conduit sections being arranged to facilitate maximum lateral displacement between the adjacent ends of the vehicles, the other conduit section being arranged to facilitate only a portion of said displacement, and transfer means in the conduit system.

3. In combination with an intercoupled locomotive and tender, a conveyer comprising a conduit section mounted on one of said vehicles to swing laterally with respect thereto, said conduit section being arranged whereby movement thereof in a vertical plane is prevented, means for limiting the lateral swinging movement of said conduit section in one direction, a conduit section flexibly jointed at one end to the first-named section and supported at its other end on the other vehicle, the second-named section extending from the locomotive to the tender, and arranged to swing laterally and vertically with respect to both vehicles, one of said conduit sections being arranged to facilitate maximum lateral displacement between the adjacent ends of the vehicles, the other conduit section being arranged to facilitate only a portion of said displacement, and transfer means in the conduit system.

4. In combination with an intercoupled locomotive and tender, a conveyer comprising a conduit section mounted on one of said vehicles to swing laterally with respect thereto, said conduit section being arranged whereby movement thereof in a vertical plane is prevented, a pair of stop elements for limiting the lateral swinging movement of said conduit section in opposite directions, a conduit section flexibly jointed at one end to the first-named section and supported at its other end on the other vehicle, the second-named section extending from the locomotive to the tender, and arranged to swing laterally and vertically with respect to both vehicles, one of said conduit sections being arranged to facilitate maximum lateral displacement between the adjacent ends of the vehicles, the other conduit section being arranged to facilitate only a portion of said displacement, and transfer means in the conduit system.

5. In an intercoupled locomotive and tender, a conveyer comprising a conduit section mounted on one of said vehicles and arranged to swing laterally with respect thereto when the vehicles operate around a curve, means for preventing movement of said conduit section longitudinally of the vehicle upon which it is mounted, a conduit section flexibly jointed at one end to the first-named section and supported at its other end on the other vehicle, the second-named section extending from the locomotive to the tender and arranged to swing laterally with respect to both vehicles when the vehicles operate around a curve, one of said conduit sections being arranged to facilitate maximum lateral displacement between the adjacent ends of the vehicles, the other conduit section being arranged to facilitate only a portion of said displacement, and transfer means in the conduit system.

6. In combination with an intercoupled locomotive and tender, a conveyer comprising a conduit section mounted on one of said vehicles to swing laterally with respect thereto, a conduit section flexibly jointed at one end to the first-named section and supported at its other end on the other vehicle, and mounted to swing laterally with respect to both vehicles, said second-named conduit section being arranged to facilitate maximum lateral displacement between the adjacent ends of the vehicles, the first-named conduit section being arranged to facilitate only a portion of said displacement, and transfer means in the conduit system.

7. In combination with an intercoupled locomotive and tender, a conveyer comprising a conduit section mounted on one of said vehicles to swing laterally with respect thereto, a conduit section flexibly jointed at one end to the first-named section and supported at its other end on the other vehicle, resilient means tending to prevent but not capable of preventing angular movement between the conduit sections, and transfer means in the conduit system.

8. In combination with an intercoupled locomotive and tender, a conveyer comprising a conduit section mounted on one of said vehicles to swing laterally with respect thereto, a conduit section flexibly jointed at one end to the first-named section and supported at its other end on the other vehicle, a coil spring interposed between the conduit sections adjacent the flexible joint, and transfer means in the conduit system.

9. In combination with an intercoupled locomotive and tender, a conveyer comprising a conduit section mounted on one of said vehicles to swing laterally with respect thereto, a conduit section flexibly jointed at one end to the first-named section and supported at its other end on the other vehicle, a resilient member attached to one of said conduit sections and having slidable contact with the other conduit section, and transfer means in the conduit system.

10. In combination with an intercoupled locomotive and tender, a conveyer comprising a conduit section mounted on one of said vehicles to swing laterally with respect thereto, a conduit section flexibly jointed at one end to the first named section and supported at its other end on the other vehicle, a pair of coil springs interposed between said conduit sections cooperating to tend to prevent angular movement between the conduit sections, and transfer means in the conduit system.

11. In combination with an intercoupled locomotive and tender, a conveyer comprising a conduit section mounted on one of said vehicles to swing laterally with respect thereto, a conduit section flexibly jointed at one end to the first-named section and supported at its other end on the other vehicle, a pair of resilient members, each of the resilient members being carried by one of the conduit sections and having slidable contact with the other conduit section, said resilient members cooperating to tend to prevent angular movement between the conduit sections, and transfer means in the conduit system.

12. In combination with an intercoupled locomotive and tender, a conveyer comprising a conduit section mounted on the tender to swing laterally with respect thereto, means for limiting the lateral swinging movement of said conduit section, a conduit section flexibly jointed at one end to the first-named section and supported at its other end on the locomotive, means for maintaining the axes of said conduit sections in a common vertical plane when the first-named means is not functioning to limit movement of the first-named section, and transfer means in the conduit system.

13. In combination with an intercoupled locomotive and tender, a conveyer comprising a conduit section mounted on the tender to swing laterally with respect thereto, means at each side of said conduit section for limiting the lateral swinging movement thereof, a conduit section flexibly jointed at one end to the first named section and supported at its other end on the locomotive, means for maintaining the axes of said conduit sections in a common vertical plane when one of the first-named means is not functioning to limit movement of the first-named section, and transfer means in the conduit system.

14. In combination with an intercoupled locomotive and tender, a conveyer comprising a conduit section mounted on the tender to swing laterally with respect thereto, means for limiting the lateral swinging movement of said conduit section, a conduit section flexibly jointed at one end to the first-named section and attached at its other end to the locomotive, means at each side of said flexible joint cooperating to maintain the axes of said conduit sections in a common vertical plane when the first-named section swings within its range of movement, and a helical screw within each of said conduit sections universally jointed together adjacent the flexible joint between the conduit sections.

15. In combination with an intercoupled locomotive and tender, a conveyer comprising a conduit section mounted on the tender to swing laterally with respect thereto, means arranged to contact said conduit section for limiting the lateral swinging movement thereof, a conduit section flexibly jointed at one end to the first-named section and attached at its other end to the locomotive, means for maintaining the axes of said conduit sections in a common vertical plane when the first-named section is not in contact with the first-named means, and a helical screw within each of said conduit sections universally jointed together adjacent the flexible joint between the conduit sections.

16. In an intercoupled locomotive and tender, a conveyer comprising a conduit section mounted on the tender to swing laterally with respect thereto, means for limiting the lateral swinging movement of said conduit section, means for preventing movement of said conduit section in a vertical plane, a conduit section flexibly jointed at one end to the first-named section and supported at its other end on the locomotive, means for maintaining the axes of said conduit sections in a common vertical plane when the first-named means is not functioning to limit movement of the first-named section, whereby the axes of said conduit sections remain in a common vertical plane when the adjacent ends of the locomotive and tender move laterally with respect to one another in negotiating a track of a degree of curvature within a predetermined range, and the axes of said conduit sections move out of a common vertical plane when the locomotive and tender are further displaced laterally with respect to one another in negotiating a track of a degree of curvature greater than said predetermined range, and transfer means in the conduit system.

17. In an intercoupled locomotive and tender, a conveyer comprising a conduit section mounted on the tender to swing laterally with respect thereto, means arranged to contact said conduit section for limiting the lateral swinging movement thereof, a conduit section flexibly jointed at one end to the first-named section and supported at its other end on the locomotive, means for maintaining the axes of said conduit sections in a common vertical plane when the first-named section is not in contact with the first-named means, whereby said conduit sections swing together when the adjacent ends of the locomotive and tender move laterally with respect to one another in negotiating a track of a degree of curvature within a predetermined range, and the second-named conduit section swings alone when the adjacent ends of the locomotive and tender are further displaced laterally with respect to one another in negotiating a track of a degree of curvature greater than said predetermined range, and transfer means in the conduit system.

18. In combination with an intercoupled locomotive and tender, a conduit section mounted on the tender to swing laterally with respect thereto, means for limiting the lateral swinging movement of said conduit section, a conduit section flexibly jointed at one end to the first-named section and supported at its other end on the locomotive, and means for preventing angular movement between the conduit sections when the first-named means is not functioning to limit movement of the first-named section.

19. In combination with an intercoupled locomotive and tender, a conduit section mounted on the tender to swing laterally with respect thereto, a pair of stop elements for limiting the lateral swinging movement of said conduit section in opposite directions, a conduit section flexibly jointed at one end to the first-named section and supported at its other end on the locomotive, and means for preventing angular movement between the conduit sections when one of said stop elements is not functioning to limit movement of the first-named section.

20. In combination with an intercoupled locomotive and tender, a conduit section mounted on one of said vehicles to swing laterally with respect thereto, means for limiting the lateral swinging movement of said conduit section, a conduit section flexibly jointed at one end to the first-named section and supported at its other end on the other vehicle, and means for preventing angular movement between the conduit sections when the first-named means is not functioning to limit movement of the first-named section.

HENRY E. LIPPERT.